United States Patent [19]
Houha et al.

[11] Patent Number: 5,734,822
[45] Date of Patent: Mar. 31, 1998

[54] APPARATUS AND METHOD FOR PREPROCESSING COMPUTER PROGRAMS PRIOR TO TRANSMISSION ACROSS A NETWORK

[75] Inventors: James A. Houha; Gordon J. Freedman, both of Cupertino, Calif.

[73] Assignee: PowerTV, Inc., Cupertino, Calif.

[21] Appl. No.: 578,202

[22] Filed: Dec. 29, 1995

[51] Int. Cl.$^6$ ............................................. G06F 9/45
[52] U.S. Cl. ............................ 395/200.6; 395/200.5; 395/200.46; 395/706
[58] Field of Search ................... 395/200.01, 200.1, 395/200.5, 200.46, 705, 706; 380/10, 20

[56] References Cited

U.S. PATENT DOCUMENTS

| | | | |
|---|---|---|---|
| 4,064,490 | 12/1977 | Nagel | 358/141 |
| 4,694,490 | 9/1987 | Harvey et al. | 380/20 |
| 4,704,725 | 11/1987 | Harvey et al. | 380/9 |
| 4,965,825 | 10/1990 | Harvey et al. | 380/9 |
| 4,982,430 | 1/1991 | Frezza et al. | 380/50 |
| 5,003,591 | 3/1991 | Kauffman et al. | 380/10 |
| 5,109,414 | 4/1992 | Harvey et al. | 380/9 |
| 5,233,654 | 8/1993 | Harvey et al. | 380/20 |
| 5,335,277 | 8/1994 | Harvey et al. | 380/20 |
| 5,347,632 | 9/1994 | Filepp et al. | 395/200 |
| 5,367,571 | 11/1994 | Bowen et al. | 380/20 |
| 5,410,698 | 4/1995 | Danneels et al. | 395/650 |
| 5,440,632 | 8/1995 | Bacon | 380/20 |
| 5,583,563 | 12/1996 | Wanderscheid et al. | 348/13 |
| 5,585,858 | 12/1996 | Harper et al. | 348/485 |
| 5,600,364 | 2/1997 | Hendricks et al. | 348/1 |
| 5,600,573 | 2/1997 | Hendricks et al. | 364/514 R |

OTHER PUBLICATIONS

Microsoft Systems Management Server Administrators Guide, Microsoft Corporation, Oct. 1994 Chapter 12 pp. 351–364 Chapter 10 pp. 281–313.

"Linkage Loader For Microprocessor Microcode", by Cox & Leggate, Jan. 1983, IBM Technical Disclosure Bulletin vol. 25, No. 8.

"Implementing Loadable Kernel Modules for Linux", by Welsch, May 1995, Dr. Dobb's Journal.

*Primary Examiner*—Mehmet B. Geckil
*Attorney, Agent, or Firm*—Kenneth M. Massaroni; John Victor Pezdek

[57] ABSTRACT

A system for preprocessing computer programs before downloading them into terminals includes a packager which processes certain information contained in compiled but unlinked programs. The packager partially resolves undefined symbols and relocations based on knowledge of a dispatch table in the destination terminal and other information known prior to the downloading process. Additionally, the packager determines the sizes of separate code, data, dispatch table and temporary symbol areas, incorporates this size information into a header, and transmits a data stream including the header and the aforementioned areas, including partially resolved symbols, to one or more terminals such as home communication terminals (HCTs) in a cable television network. Each receiving terminal extracts the size information and allocates only as much memory as is needed to store each of the separate areas, thus avoiding the need for a temporary holding buffer. The receiving terminal thereafter relocates remaining executable instructions to prepare the computer program for execution.

24 Claims, 9 Drawing Sheets

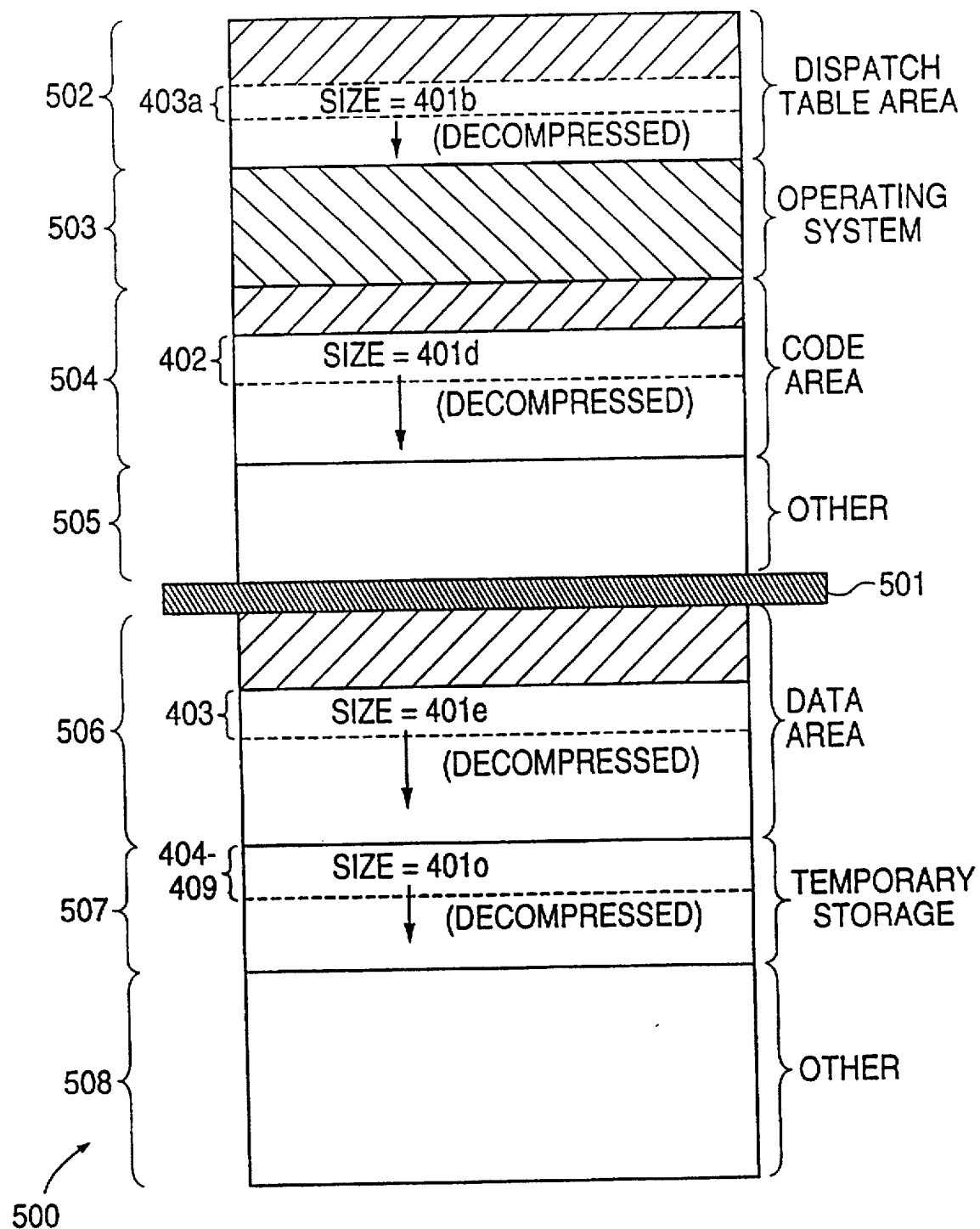

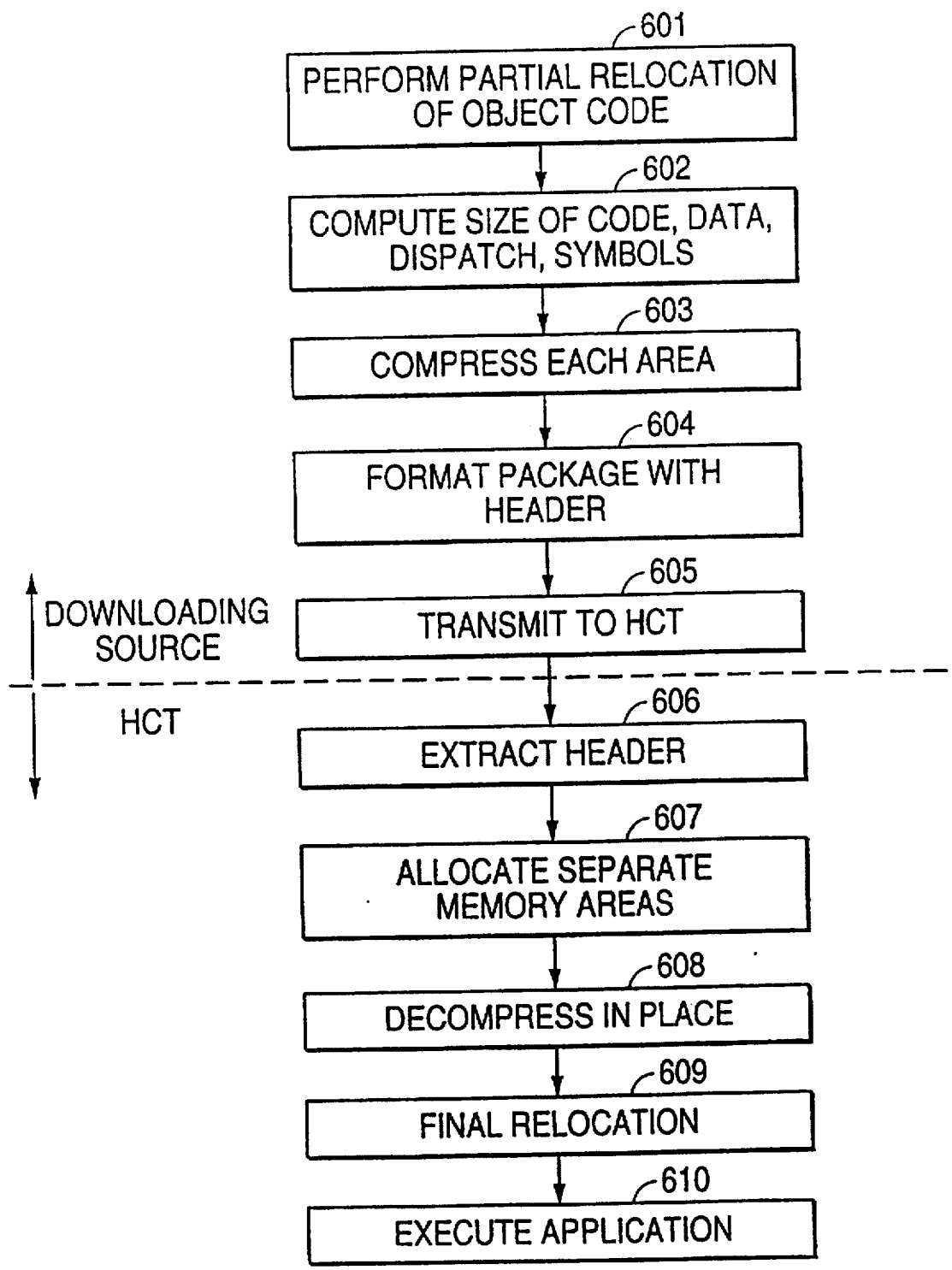

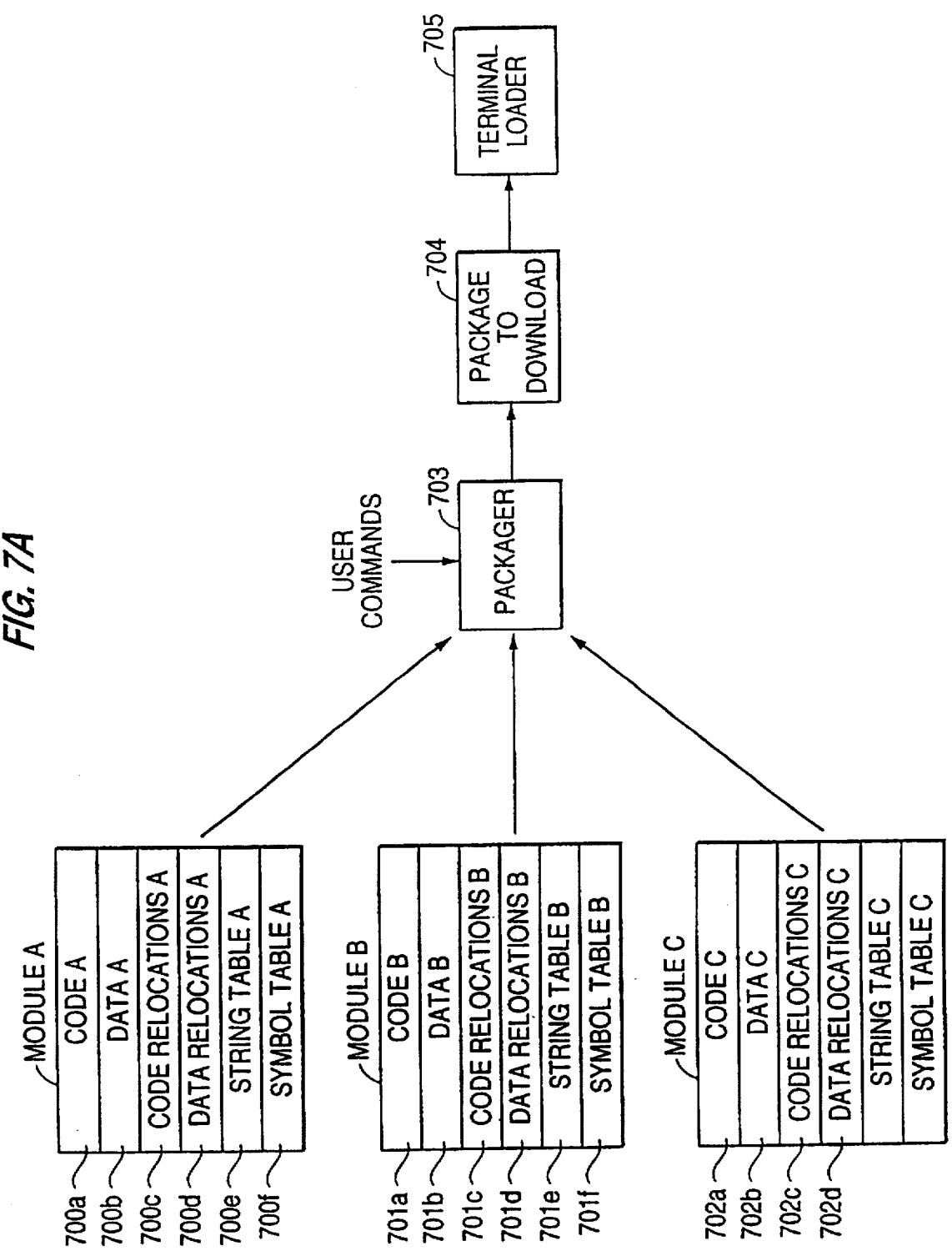

APPARATUS AND METHOD FOR PREPROCESSING COMPUTER PROGRAMS PRIOR TO TRANSMISSION ACROSS A NETWORK

BACKGROUND OF THE INVENTION

1. Technical Field

This invention relates generally to systems for downloading computer programs over a network into terminals, such as home communication terminals (HCTs) in a cable television network. More specifically, the invention provides an apparatus and method for increasing the efficiency with which computer programs can be downloaded and prepared for execution in such terminals.

2. Related Information

Systems capable of downloading computer software into terminals such as HCTs in a subscription television system are well known. For example, U.S. Pat. No. 5,440,632, entitled "Reprogrammable Subscriber Terminal", describes a system including means for reprogramming subscriber terminals by downloading code in a series of transactions. Such systems can be used to add new applications, or to replace outdated or faulty software.

The need to provide new features such as multimedia applications, higher performance graphics, and the like has led to additional processing capabilities and memory requirements in the HCTs. Unfortunately, because memory constitutes a significant cost component of HCTs, inefficient use of the memory can lead to unacceptably high costs.

The present inventors have determined that conventional methods of linking and loading new or modified computer programs into HCTs do not make efficient use of memory in the HCT and, therefore, more innovative approaches are required to minimize the mount of memory required. In particular, the manner in which HCTs conventionally load computer programs from a headend or other downloading source requires a large memory footprint in the HCT. As one example, conventional approaches require allocation of a buffer area in the HCT to receive a new or modified load image, in addition to allocating the final destination memory areas for the newly downloaded image. The allocated buffer area is essentially wasted since it is not needed after the loading operation.

As another example, conventional approaches for downloading new programs either require that a complete executable image be linked prior to downloading into the HCT—thus preventing selective downloading of separate programs into the HCT—or they require a linking loader in the HCT, taking up unnecessary memory space and complicating the HCT software design. In view of these and other problems, conventional downloading approaches have been determined to suffer from significant drawbacks.

SUMMARY OF THE INVENTION

The present invention solves the aforementioned problems by judiciously partitioning linking loader functions between a downloading source (such as a development computer, a headend computer or a combination of both) and a terminal such as an HCT. In particular, many functions which are conventionally performed by a linking loader are instead performed during a "packaging" step before downloading into the terminal. A "packager" utility at the downloading source operates on the output of a compiler to simplify the loading operations performed by a loader in the terminal. In various embodiments, the "packager" can perform functions including (1) partial code relocation; (2) determination of load size parameters; and (3) formatting executable code into a common format, independent of the code type from which it originates. Each of these functions is discussed separately below.

Partial Code Relocation.

A conventional paradigm of creating executable code consists of the steps of compiling source code into object code, linking and relocating the object code into an executable image, and downloading the executable image into the terminal. In contrast, the present invention contemplates steps of (1) compiling source code into object code; (2) "packaging" the object code by resolving certain undefined symbols after compile time using a dispatch table mapper and other information about the terminal known at the downloading source; (3) downloading the "packaged" code across the cable network into the terminal; and (4) relocating any remaining code (as necessary) in the terminal. Many traditional linking loader functions are thus off-loaded from the terminal to the downloading source to reduce memory requirements in the terminal.

Because the packager at the downloading source has knowledge of the dispatch table in the terminals, it can resolve many addresses before transmitting a load stream to the terminal, thus speeding up the load operation and reducing the size of the load stream. For example, the packager can replace many "branch relative to program counter" instructions generated by the compiler with absolute instructions (branch to absolute address) before transmitting them to the loader in the terminal. The packager can also do the opposite (i.e., it can change absolute branches into relative branches). This reduces the volume of the load stream and removes many address relocation operations from the terminal. (For example, when unresolved addresses are transmitted to the terminal, ancillary information needs to be transmitted to indicate the location of the unresolved addresses in the load stream; resolving these addresses at the downloading source eliminates this ancillary information and thus saves memory space). In summary, some of the relocation functions normally performed by a linking loader are partitioned into those that can be done at the downloading source, and those that must be performed by a loader in the terminal.

Determination of Load Size Parameters in the Headend.

The "packager" at the downloading source determines how large various parts of the load stream will be and transmits this size information in advance to the terminal, which thereafter need only allocate the minimum amount of memory required to perform the loading operation. The loader in the terminal can thus permanently allocate memory spaces for each separate load stream segment without the need to also allocate wasteful intermediate storage areas.

For example, if a 400 kilobyte load stream is to be received from the downloading source, 200 kilobytes of this may constitute unmodifiable code, 100 kilobytes may constitute modifiable data, and the remaining 100 kilobytes may constitute temporary symbol information which will be discarded after the loading operation. (As is conventional, code and data segments are typically segregated into different areas in memory so that the code can be stored in ROM or made write-protected in memory.)

Conventional loaders would allocate 400 kilobytes of storage to hold the load stream, and would subsequently (after determining how much code is present) allocate a 200 kilobyte buffer to hold the code, a 100 kilobyte buffer to hold the data (after determining how much data is present), and another 100 kilobyte buffer to hold the temporary symbol information. This conventional approach requires twice as much memory as is eventually required to hold the executable image.

While conventional loaders have access to a disk drive to store intermediate data during the loading operation, an HCT typically has no such disk and has very limited memory. Therefore, the terminal cannot afford to use intermediate data storage areas during the loading operation. Being able to identify in advance that only 200 kilobytes of code area will be needed allows the terminal to allocate only this amount in its memory prior to actual loading, instead of allocating 400 kilobytes and then discarding what was not needed.

Formatting Executable Code Into a Common Format.

In various embodiments, the packager can "distill" executable code into a common format for use by a loader in the terminals. This allows the loader in the terminals to be as simple as possible, by offloading logic which handles different code file formats (COFF, ELF, PEF) to the packager. Use of a common format also allows further optimizations which can reduce the size of the code stream which needs to be loaded across the network into terminals.

Other features and advantages of the present invention will become apparent through the following detailed description, the drawings, and the appended claims.

BRIEF DESCRIPTION OF THE DRAWINGS

FIG. 5 shows one possible memory allocation scheme for a terminal in which separate areas for code, data, dispatch table and temporary symbols may be allocated to store portions of the load package from FIG. 4.

FIG. 6 shows various steps which may be performed to transform a set of object code instructions into a load package which is downloaded into a terminal and prepared for execution.

FIG. 7 A shows how a packager 703 can combine one or more compiled object code modules A, B, and C into a package 704 for downloading across a network and subsequent loading by terminal loader 705.

DETAILED DESCRIPTION OF THE PREFERRED EMBODIMENTS

Figure 1:
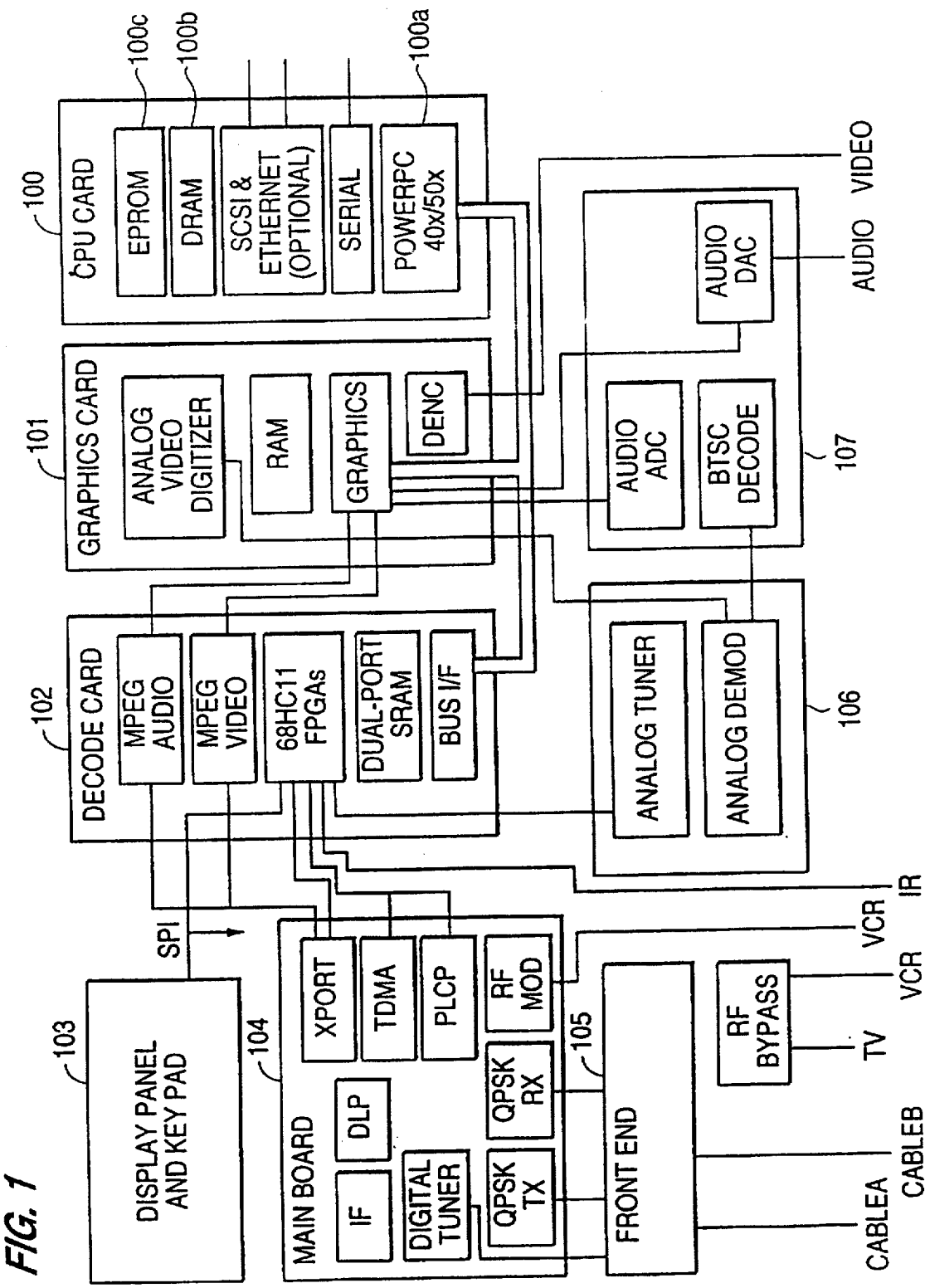
FIG. 1 shows one possible configuration for a home communication terminal (HCT) into which code may be downloaded and executed in accordance with various aspects of the invention.

FIG. 1 shows a block diagram of a home communication terminal (HCT) which may serve as one possible terminal for downloading module packages. The terminal may include a CPU card 100, graphics card 101, decoder card 102, display panel and key pad 103, main processing board 104, front end 105, tuning section 106, and audio section 107. It is contemplated that the inventive principles may be practiced using any suitable CPU 100a such as a PowerPC or Motorola 68000 series, with suitable EPROM 100c and RAM 100b. It is also contemplated that application programs executing on CPU 100a can interact with various peripherals such as a mouse, game controllers, keypads, network interfaces, and the like, as is well known in the art. A terminal loader program may reside in memory on CPU card 100, and be executed by CPU 100a.

Figure 2:
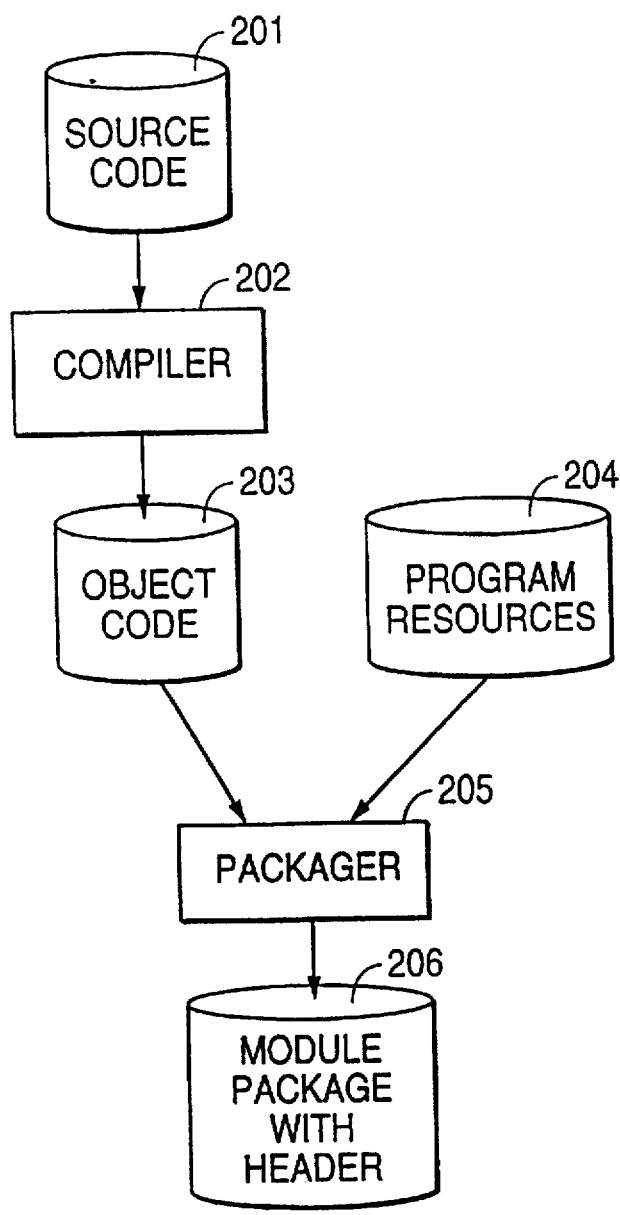
FIG. 2 shows a sequence of stages, including products produced at each stage, for generating a loadable module package in accordance with various aspects of the invention.

FIG. 2 shows a sequence of stages, including products produced at each stage, for generating loadable module packages at a downloading source in accordance with various aspects of the invention. In stage 201, source code may be created by a programmer on a development system in a suitable programming language such as C. For example, a programmer may create a new video game application which allows a terminal user to play poker on the television set connected to his terminal.

In stage 202, a compiler such as a conventional C compiler converts the source code into an object code file 203. However, unlike conventional approaches, the object file is not linked and loaded into an executable image, and is not immediately transmitted to the terminal for subsequent linking and loading. Instead, a packager 205 is used to transform object file 203 into a loadable module package with header 206 using program resources 204. Program resources 204 may include a mapping of symbol names to dispatch table entries in each terminal, as discussed in more detail herein.

For example, packager 205 may replace a relocatable instruction in object code 203 with an absolute instruction based on knowledge that a function corresponding to the symbol can be accessed through a known terminal dispatch table entry, thus avoiding the need to transmit intermediate loader information across the network. In various embodiments, loadable module 206 is then transmitted across the network to one or more terminals for final loading. A loadable module package may comprise a library of functions, an operating system patch or extension, a system resource, or an application program, for example.

Figure 3:
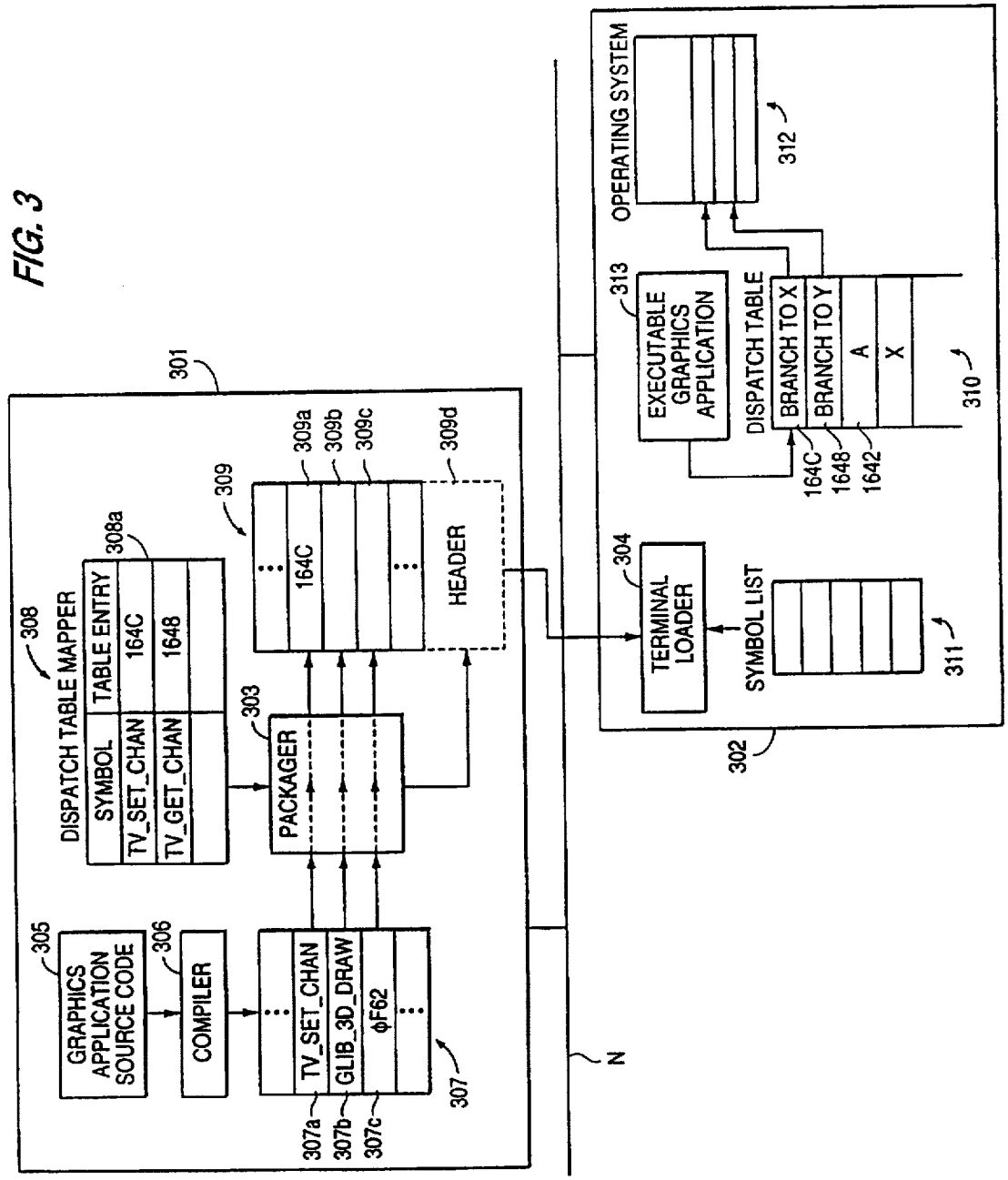
FIG. 3 shows how a packager 303 at a downloading source 301 can transform a set of object code instructions 307 into a load package 309 through the use of a dispatch table mapper 308.

FIG. 3 shows how a packager 303 at a downloading source 301 may transform an object code file 307 into a module package 309 including a header area 309d for downloading into a terminal 302 over a network N such as a cable television network. Packager 303 need not physically reside at downloading source 301 but may instead reside on a development computer. Other configurations of the components are of course possible.

In general, an application program or other collection of source code 305 is compiled into object code 307 using a conventional compiler 306, such as a C or C++ compiler. As depicted in FIG. 3, object code 307 may include various types of references to instructions and data which need to be resolved before they can be executed. For example, object code 307 may include a reference to an application programming interface routine 307a (TV_set_chan), a reference to a general library function 307b (GLib_3D_Draw), and a reference to an absolute memory location 307c (0F62 hex) in the terminal. In accordance with various aspects of the invention, packager 303 transforms some of these undefined symbols into resolved symbols in module package 309 prior to transmission to terminal 302. Packager 303 may resolve these symbols using dispatch table mapper 308, which includes entries which map symbols to dispatch table entries in terminal 302.

It is contemplated that terminal 302 includes a dispatch table 310 comprising entries of pointers and/or branch (jump) instructions. Thus, for example, when an executable application program 313 such as a video game invokes an operating system function, the call is dispatched through dispatch table 310 which contains a pointer to the memory location in operating system 312 where the code for the function starts. This feature allows functions to be replaced or moved around in the operating system without modifying programs which call them. Furthermore, it allows an operating system to be permanently stored into ROM (i.e., functions are dispatched to memory addresses in ROM) but allows changes to be "patched" into other modifiable memory locations by changing the pointers in dispatch table 310.

Thus, for example, a new version of an operating system function can be installed by merely storing the new version in modifiable memory and changing the pointer to the function in dispatch table 310 so that it no longer points to the ROM version of the function (i.e., "rerouting" the function to the newer version in a different memory area).

Instead of pointers to functions, actual jump or branch instructions may be used as the entries in dispatch table 310 to speed up processing. Thus, for example, when executable graphics application 313 references a function mapped to location 164C in dispatch table 310, the entry for that location contains a "branch to X" instruction which can be directly executed, instead of a pointer which must be loaded followed by a branch instruction to that pointer.

Returning again to the operation of packager 303 in downloading source 301, suppose that the output of compiler 306 includes a reference to a function TV_set_chan which sets the current channel number of the terminal for tuning purposes. Packager 303 finds a corresponding entry 308a in dispatch table mapper 308 which indicates that the required function (TV_set_chan) can be patched through dispatch table entry 164C (hex) in dispatch table 310 in terminal 302. Accordingly, packager 303 replaces the reference to symbol TV_set_chan in the object code with a reference to dispatch table entry 164C. Thereafter, no further relocation of this instruction is required in terminal 302 after the package is downloaded, thus saving symbol space.

As another example, suppose that GLib_3D_Draw is in a shared library known to packager 303. Packager 303 can change this symbol GLib_3D_Draw in file 307 to refer to the symbol in the shared library. It can do this by first ensuring that the library with the symbol is referenced in a table it adds to package 309. The shared library table can include the name of the shared library, and the position of each entry in the table can be used as an index within the symbol to indicate the shared library the symbol refers to. The symbol in package 309 thus includes an index into the shared library table of the shared library containing the actual value for GLib_3D_Draw, and packager 303 can copy the other relevant information from the shared library into a symbol table in package 309 (the section, data or code, that GLib_3D_Draw is in, and the offset into that section). Terminal loader 304 will thus be able to use this information to locate the relevant section (code or data) in the shared library which must be loaded into the terminal and relocate any references in the package to that symbol.

In addition to a "terminal" dispatch table in each terminal, each module may have associated therewith its own dispatch table which contains entries for any function that can be called outside the module (i.e., so-called "exported" functions). These dispatch tables can be concatenated into a module dispatch table (MDT) and included in the load package for storage into each terminal; each terminal can thereafter extract the MDT and use it to reference functions in conjunction with the terminal's dispatch table. A macro can be used to generate a dispatch table for all "exported" functions in a module.

It should be noted that the packaging step can be combined into the compiling step, such that the compiler itself resolves certain references as explained above. Furthermore, the compiling and packaging steps could be performed at different times or on different machines.

Terminal 302 includes terminal loader 304 which receives load package 309 and extracts the header information therefrom (see discussion of FIG. 4 below). Additionally, terminal 302 may include a symbol list 311 which includes a list of symbols which have yet to be resolved. Symbol list 311 can be sourced from two places: one, a static list which is compiled into terminal loader 304, which can contain fully resolved symbols referring to the operating system; and second, from the incoming load stream. This list of symbols can refer either to shared library symbols (as described above), or to locations within the load stream's local data and code sections. The information in the symbols referring to shared library sections can be used along with the start of the code and data areas of those shared libraries to relocate references to the symbols in those shared libraries. The information contained within the local symbols, along with the start of the code and data areas where the load stream is loaded, can be used to resolve references to the load stream's local symbols.

In general, as explained in additional detail below, terminal loader 304 receives a load package from downloading source 301, extracts a header therefrom, allocates separate memory areas based on the header information, decompresses data from the separate memory areas, and resolves any remaining unresolved references, thus producing a prepared module such as executable graphics application 313.

Figure 4:
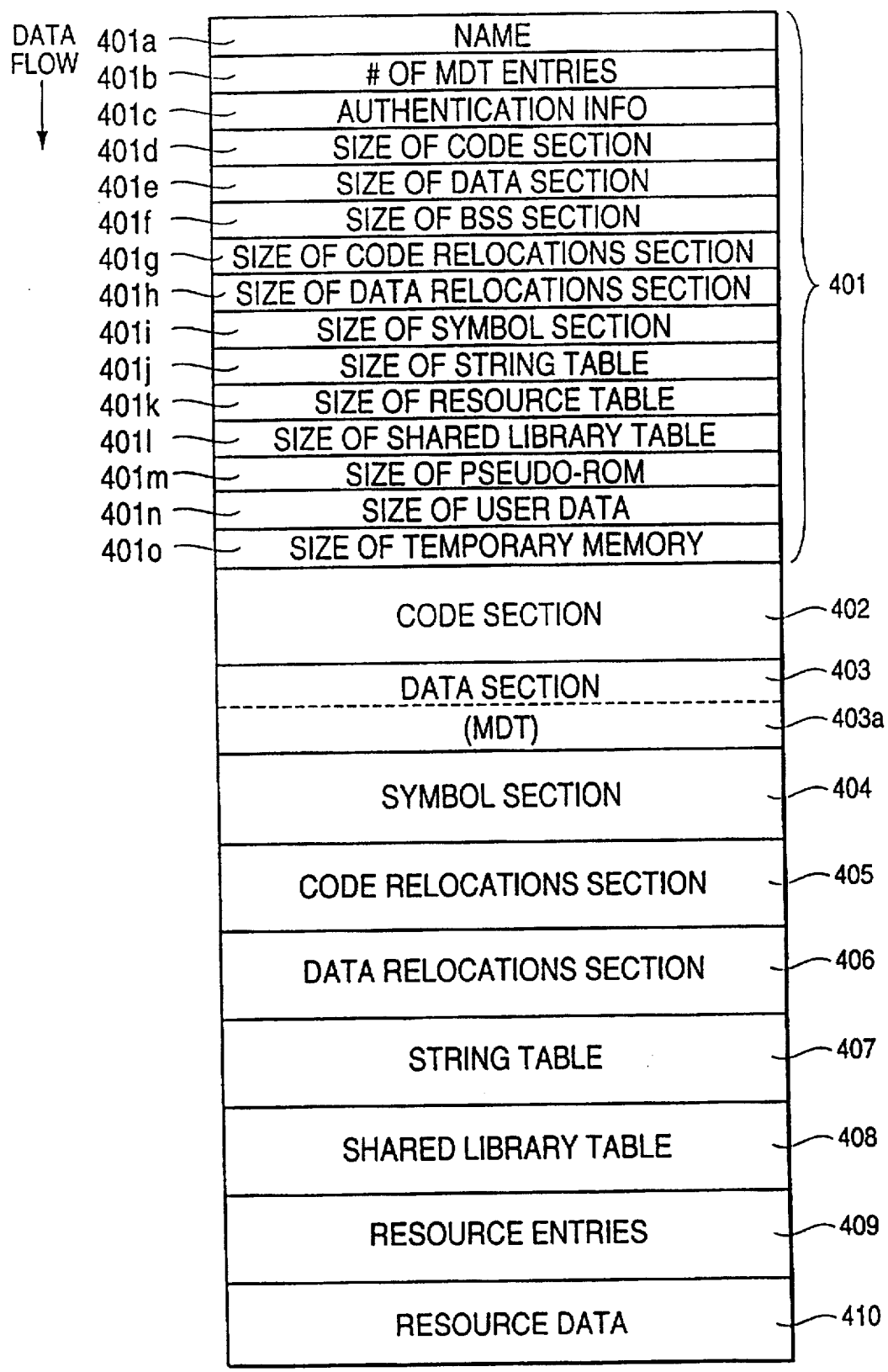
FIG. 4 shows one possible format for load package 309 which can be downloaded across a network into a terminal in accordance with various aspects of the invention.

FIG. 4 shows how a package to be loaded into a terminal can be transmitted as a segmented data stream preceded by a header 401. For example, if a new video game application is to be installed onto an existing terminal, it may be formatted into a package such as that shown in FIG. 4 and transmitted in a data stream to the terminal. Such a transfer may occur in response to a point-to-point request, or it may instead be performed using a multicast download approach.

As depicted in FIG. 4, the load package preferably comprises a header 401 which indicates the sizes of various sections which follow in the load package. For example, header 401 may include a name 401a indicating the name of the load module, a field 401b indicating the number of Module Dispatch Table (MDT) entries which are included in the load package, authentication information 401c which can be used to authenticate the load package such as through a digital signature; a size 401d of the code section 401 in the load package, a size 401e of a data section 403 in the load package, etc. as shown in FIG. 4. These sizes are preferably determined by packager 303 as part of the packaging process and inserted into the header.

Additionally, packager 303 can calculate certain total sizes such as size of pseudo-ROM 401m (the size of read-only memory required for the code section and unmodifiable resources); size of user data 401n (the size of the data section and modifiable resources); and size of temporary memory 401o (size of the symbols, code and data relocations, string table, resource entries, shared library table). These sizes can be used by terminal loader 304 to determine how much of each type of memory area to allocate.

Following header 401 are the actual code, data, symbol, relocation, and other sections as depicted in FIG. 4. In various embodiments, the module dispatch table (MDT) may be stored in data section 403 rather than creating a separate area for it.

The load package shown in FIG. 4 may be compressed to speed up transmission across the network, preferably by compressing each individual area such as 402, 403, etc. As terminal loader 304 receives the data stream shown in FIG. 4, it extracts the sizes from header 401 and allocates separate memory areas to store and (optionally) decompress the areas shown in FIG. 4.

FIG. 5 shows how memory in a terminal such as an HCT may be allocated in order to efficiently load an incoming package. As is conventional, memory 500 may be partitioned by a "firewall" 501 which segregates memory addresses which cannot be modified by user-mode code (above firewall 501 in FIG. 5, i.e., memory which can be modified only by supervisor mode code), from addresses which may be modified by user mode code (below firewall 501 in FIG. 5, i.e., memory which can be modified by any application program executing on the terminal).

As can be seen in FIG. 5, the protected portion of memory 500 above firewall 501 is further partitioned into a dispatch table area 502, operating system area 503, code area 504, and "other" area 505 which may include, for example, protected operating system data. Similarly, the non-protected portion of memory 500 below firewall 501 is further partitioned into a data area 506, a temporary storage area 507, and an "other" area 508. Cross-hatched areas in FIG. 5 indicate memory areas which have already been allocated and thus are not available for use by terminal loader 304.

In accordance with various aspects of the invention, terminal loader 304 (see FIG. 3) receives header 401 (see FIG. 4) and extracts therefrom the size of the pseudo-ROM (containing read only memory for code section 402, and unmodifiable resources from resource data 410), user data (containing modifiable memory for data section 403 and modifiable resources from resource data 410), and temporary storage to be used only when loading the package and discarded thereafter (e.g., symbol section 404, code relocations section 405, data relocations section 406, string table 407, shared library table 408, and resource entries 409). Terminal loader 304 thereafter allocates corresponding memory areas in the appropriate firewall portions of memory 500. The sections are then read into the appropriate portions of the allocated memory areas. Note that the order in which the sections appear in the package need not be the same order as they appear in memory 500; however, by reading them into the portions of the allocated memories in a "piecemeal" fashion, a downloaded program can be read into the correct areas of memory without wasting a large intermediate storage area.

Thus, for example, terminal loader 304 allocates memory in memory areas 504 and 505 for the pseudo-ROM type information, and reads the code section 402 into area 504, and reads each resource (from 410) which is tagged as modifiable by a corresponding resource entry in 409 into modifiable area 508. It also allocates area 507 to use temporarily while loading, and reads the symbol section 404, code relocations section 405, data relocations section 406, string table 407, shared library table 408, and resource entries 409 into area 507. It also allocates memory for the MDT, of a size indicated by 401b, from within section 502, and copies the MDT into unmodifiable area 502. It is preferable that the header precede the data areas in the data stream so that terminal loader 304 can allocate memory areas for the remaining incoming portions of the data stream.

In various embodiments, each of the code, data, dispatch table, and disposable symbol areas may be compressed for transmission across the network. Accordingly, each compressed area can be copied into the appropriate memory area and "decompressed in place" using well known principles. If such data compression is used, then the sizes of the aforementioned areas transmitted in the header (and allocated in memory) would correspond to the decorepressed size, and the decompression would proceed after the compressed areas had been loaded in the allocated areas.

The approach depicted in FIGS. 4 and 5 provides important memory-saving benefits in each terminal. By determining the size of each memory area and transmitting this size information at the beginning of the load stream, terminal loader 304 need allocate only the minimum amount of separate memory areas required to hold the incoming data, instead of allocating a large temporary holding area to store the entire incoming data stream followed by allocations of separate memory areas to unpack and further process the data stream.

FIG. 6 shows a series of steps which may be performed to convert object code into a module package for loading into a terminal. Some or all of steps 601 through 605 may be performed at a downloading source or authoring source, while steps 606 through 610 may be performed within a terminal such as an HCT.

Beginning in step 601, a packaging utility such as packager 303 of FIG. 3 may be used to perform a partial relocation of object code in accordance with program resources such as a known dispatch table in the terminal. This process is described in more detail below. In step 602, the size of the code, data, dispatch table area and disposable symbols in the package may be computed based on the partial relocation. In step 603, each of the aforementioned areas may be compressed and, in step 604, formatted into a package with a header which includes the aforementioned sizes. In step 605, the formatted package with header is transmitted to the terminal over a network.

In step 606, the receiving terminal extracts the header and determines the memory area sizes needed for each of the corresponding areas. In step 607, separate memory areas are allocated in accordance with the memory allocation scheme shown in FIG. 5. In step 608, each area is decorepressed in place, thus expanding the area to its full capacity in the memory. In addition to decompression, the terminal may check a digital signature to ensure the authenticity of each downloaded package. In step 609, terminal loader 304 performs any remaining relocation in the terminal, as explained in more detail below. Finally, in step 610, the relocated application may be executed in the terminal.

Packager 303 may be implemented to accept user inputs to control the packaging process. The following types of commands, for example, may be used to control the transformation of object code 307 into loadable module 309:

(1) Create a new module package and specify the name of the module contained in it. The name of the module need not be the same as the name of its module dispatch table.

(2) Read and process commands from a specified file. For example, this can be used to resolve references to an application programming interface (API) function resident on the terminal by supplying a definitions file containing a mapping of symbol names to entries in the terminal's module dispatch table.

(3) Add a system resource to the module package. A system resource is something that an application may require in order to run, such as a graphic image or a digitized sound file. Resources can be either modifiable or unmodifiable. The terminal loader preferably puts modifiable resources into read/write memory, and modifiable resources into read-only memory in the terminal.

(4) Add a symbol to a package by specifying the symbol name and its system address. A symbol can represent a procedure, variable, I/O device, etc.

(5) Set a module's base address. This can be used to specify the address at which the code section of the module will be loaded in the terminal memory.

(6) Add one or more object files to the module package by listing their file names. Object files may be supplied in any of various formats, such as COFF, ELF, or PEF format (each of these is an industry standard format), and the packager can convert them into a common format.

(7) Save a module package into a specified file name.

(8) Open the module package stored in the specified file. This can be used, for example, prior to adding a resource to the module package.

(9) Delete a system resource from an existing module package.

(10) Delete the value of a symbol (not the symbol itself) from an existing module package. This leaves the symbol's value undefined.

(11) Strip a module package (deletes relocations and global symbols that are no longer needed). This is an optimization that makes loading faster and reduces the size of module package files.

(12) Relocation (the process of creating references between code and data, code and code, and data and data). This process may be performed automatically after object files are added to a module package (see command (6) above). Relocation can be repeated on a module package that has already been relocated by simply adding or removing executables from a module package.

(13) Show unresolved references. This can be used to show references to things that the packager could not find, in order to verify that symbols have been resolved.

Other approaches are of course possible, and the above types of commands are not intended to be limiting. A module could take one or more of the following forms:

(1) a library of functions, similar to a dynamic link library (DLL); these functions are callable by other applications in the terminal.

(2) an operating system patch or extension, containing replacement code for functions already included in the operating system. Once a patch is loaded into the terminal, pointers to the old code are updated to point to the replacement code.

(3) a system resource, such as a new font or sound clip.

(4) an application program.

In accordance with various aspects of the invention, each module may be assigned a unique identifier which may be used to "launch" the module in the terminal. Additionally, each module may provide to the operating system in the terminal a module dispatch table which includes the following information:

(1) The number of entries in the module's dispatch table. This may be determined by the packager. When a module is loaded in the terminal, its dispatch table is added to the system's dispatch table; when it is unloaded, its dispatch table is unloaded from the system's dispatch table.

(2) A pointer to the module's information string. This includes information about the module, such as a text string identifying its version number, author, date, etc. Immediately following the information string entry, the actual module dispatch table itself may be included.

(3) A pointer to the module's initialization method. This enables the terminal to initialize a module immediately after it is loaded. In other words, the module provides a pointer to a routine which causes the module to initialize itself.

(4) A pointer to the module's shutdown method. This enables the terminal to unload a module and to free its dispatch table. In other words, the module provides a pointer to a routine which, when executed, unloads the module and frees its dispatch table.

Each module dispatch table may include entries for the following items:

(1) A pointer to the application's main loop (identifies the primary entry point of the application). Once an application is loaded, an Application Manager in the terminal can execute the application's main loop to run the application.

(2) Application flags (can be used to indicate whether the application will only run in the background and cannot be activated, or no flags).

(3) Application stack size (the size, in bytes, of the stack to allocate). May be set to a default size or a predetermined constant.

(4) Application priority (used to determine the relative priority of currently-running applications).

(5) A pointer to application resources (those things which an application needs in order to run, such as graphic images or digitized sound files). When adding resources to a module package, this entry may be automatically added by the packager.

FIG. 7A shows how a packager 703 can process one or more compiled object code modules A, B, and C into a package 704 for downloading across a network and subsequent loading by terminal loader 705 in accordance with various aspects of the invention. As described above, various user commands can be input to packager 703 to control the packaging process.

As is conventional, each compiled object code module may include various sections for different types of information. For example, module A in FIG. 7A includes a code section 700a comprising executable instructions; a data section 700b comprising modifiable data items; a code relocations section 700c containing flags that certain instructions in code section 700a need to be "relocated" (i.e., they include a branch to an unknown address); a data relocations section 700d containing flags that certain data items in data section 700b need to be "relocated" (i.e., they refer to an unknown memory location); a string table 700e, and a symbol table 700f which indicates whether a particular symbol is local or external. Modules B and C include similar sections. In accordance with various aspects of the invention, packager 703 "packages" modules A, B, and C into a package 704 by resolving certain symbols and relocations prior to transmission across a network, thus reducing the amount of information which must be transmitted and reducing the amount of memory required by terminal loader 705.

Figure 7C:
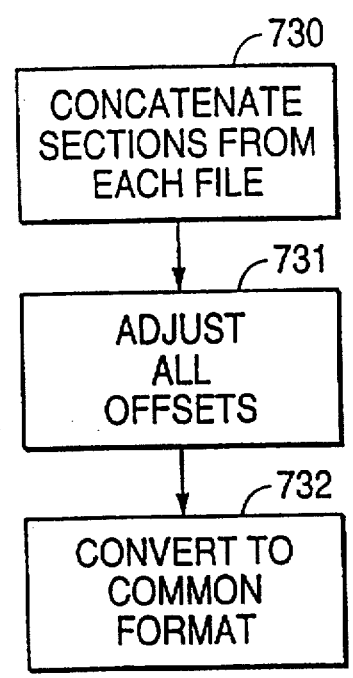
FIG. 7C shows how sections from each of several input files can be combined prior to performing the processing steps shown in FIG. 7B.
Figure 7B:
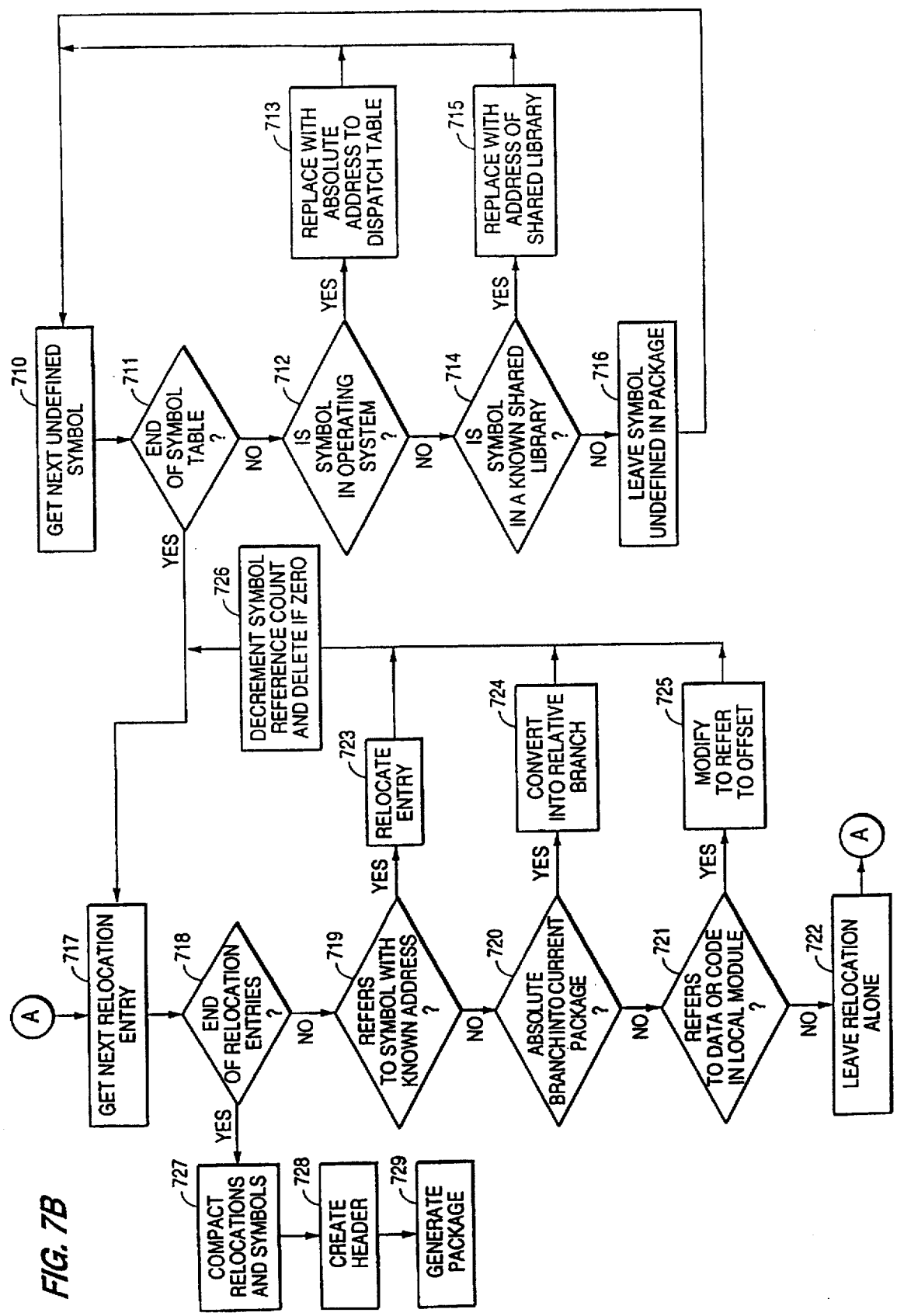
FIG. 7B shows details of the partial relocation process at a downloading source (step 601 of FIG. 6), such as can be performed by packager 703.

FIG. 7B shows additional details of the partial code relocation step (step 601 of FIG. 6) which can be performed by packager 703. In general, it may be preferable to process all symbols before performing any relocation.

Beginning in step 710, each undefined symbol is retrieved from an object code module such as module A. In step 711, a test is made to determine whether there are any more symbols in the symbol table. Assuming that there are more symbols, step 712 is executed; otherwise, processing of relocation entries is performed beginning in step 717.

In step 712, a test is made to determine whether the undefined symbol refers to an operating system address known to the packager. The packager may obtain such knowledge by way of, for example, a user command which provides a file containing a mapping of operating system symbols to dispatch table entries in each terminal. If the symbol is a known operating system symbol, then in step 713 the symbol's address is replaced with an absolute address corresponding to the dispatch table entry which refers to an operating system routine or data section for that symbol. Processing thereafter resumes in step 710 with the next undefined symbol.

In step 714, a test is made to determine whether the undefined symbol refers to a shared library known to the packager. The packager may obtain such knowledge by way of, for example, a user command which provides a file containing a mapping of shared library names with symbols. If the symbol is a known shared library symbol, the symbol is modified to refer to the shared library address. To accomplish this, a table may be appended to package 704 which includes information regarding the name of the shared library, and the position of each entry in the table can be used as an index for the symbol. The packager can copy other relevant information from the shared library into the package (such as the data or code section that the symbol is in, and the offset into that section) so that terminal loader 705 can complete the relocation of any relocation entries which reference the symbol, after being downloaded across the network. After step 715, processing resumes at step 710 with the next undefined symbol.

Generally speaking, if a symbol is neither in the operating system nor in a known shared library, then in step 716 the symbol may be left undefined, and terminal loader 705 may complete the symbol resolution process based on information subsequently loaded across the network or already in the terminal.

After all undefined symbols have been analyzed, then in step 717 the process of partial relocation can be initiated. In step 717, the next relocation entry (code or data) from a module is retrieved. In step 718, a test is made to determine whether there are any more relocation entries to be analyzed and, if the end of all relocation entries has been reached, a branch to step 727 is made.

Assuming that more relocation entries exist in step 718, then in step 719 a test is performed to determine whether the relocation refers to a symbol with a known address. If so, then in step 723 the entry is "relocated" (i.e., the address of the referenced data or instruction is adjusted according to well known techniques), and the relocation entry is deleted. Thereafter, in step 726 a reference counter for that symbol is decremented and, if zero, the symbol itself is deleted from the symbol table.

If, in step 720, the relocation contains an absolute branch into the current module, then in step 724 the branch instruction is converted into a relative branch, and the target address is calculated as the difference between the symbol's address the relocation refers to, and the address of the branch instruction that will branch to the symbol. For example, suppose that an instruction located at offset 0×2000 in the object code is an absolute branch to a local symbol located at offset 0×3000 in the code. The branch instruction is converted to a relative branch, and the target address is 0×1000, which is 0×3000 minus 0×2000. The relocation entry is also removed since it is no longer needed. Thereafter, in step 726 a reference count for the symbol it refers to is decremented and, if zero, the symbol itself is deleted.

If in step 721, the relocation refers to data or code which is local to the module, then in step 725 the relocation entry is modified such that it contains an offset into the code or data section as appropriate, a bit indicating which section it refers to (code or data) is set, and a flag is set to indicate that this information exists and no symbol is required. Thereafter, in step 726 the corresponding symbol reference count is decremented, and the symbol is deleted if the reference count is zero.

If a relocation meets none of the criteria in steps 719, 720, or 721, then in step 722 the relocation entry is left alone, and processing resumes at step 717 with the next relocation entry. In other words, the relocation will be left for terminal loader 705 to relocate after downloading into the terminal.

Referring again to step 718, once all relocation entries have been processed, then in step 727 the relocation and symbol sections are "compacted". In other words, memory space corresponding to deleted symbols and relocation entries is removed, thus "compacting" the total space needed to store any remaining undefined symbols or relocation entries in package 704. Additionally, the string table section—used to store character strings associated with symbol names—can be compacted such that only the strings required for the remaining symbols are kept. One result of this compaction is a reduction in the bandwidth required to transmit modules A, B, and C to a terminal, since packager 703 has performed some of the symbol resolution and relocation which would otherwise need to be performed by terminal loader 705. A second result of this compaction is that less memory space needs to be allocated in each terminal for terminal loader 705 to store the temporary loading information—i.e., undefined symbols and relocation entries.

In step 728, a header is created for the package based on the above executed steps. For example, as shown in FIG. 4, the size of the aggregate code section 402, size of the aggregate data section 403, size of the dispatch table section 404a and the remaining disposable information such as 404 through 409 is determined. These sizes can be determined by extracting the size of the code, data, and other areas from each module input to the packager and adding them together, less any symbols and relocations which were deleted as a result of the partial relocation process described above.

A dispatch table portion of each package can be created by concatenating dispatch tables created for each module using macros. Generally speaking, each module may have associated therewith its own dispatch table which contains entries for any function that can be called outside the module (i.e., so-called "exported" functions). These dispatch tables, after being concatenated, can be stored into each terminal in read-only memory to prevent corruption. A macro can be used to generate a dispatch table for all "exported" functions in a module, and this dispatch table can be initially stored in the data section such as 700b (see FIG. 7A) in the module. Packager 703 (see FIG. 7A) can locate each such dispatch table, initialize its size as the first entry, and concatenate the tables into dispatch table entries for downloading to terminal loader 705. Terminal loader 705 can extract the length of the table, and copy the entries therefrom into memory, which can be collocated with operating system dispatch table 310 (see FIG. 3).

FIG. 7C shows how sections from each of several input files can be combined prior to performing the processing steps shown in FIG. 7B (i.e., as shown in FIG. 7A, multiple precompiled input files can be combined into a single package 704). In step 730, corresponding sections from each input file are combined into a single section by concatenation (i.e., all of the code sections are concatenated into a single code section, all of the data sections are concatenated into a single data section, etc.).

Next, in step 731, all offsets contained in the sections are adjusted to account for the concatenation. Thus, all offsets or indexes in one file to other sections within that file must be adjusted, since they now may follow a previous file. For example, if the first file has a code section having a size of 300 bytes, any references in the second file to offsets in the second file's code section must be increased by 300, since the code is offset by that amount when concatenated after the first file's code section.

Finally, in step 732, all relocation entries, symbol table entries, and string table entries can be converted into a common format independent of the file type (e.g., COFF, ELF, or PEF format). Any suitable format can be used; this can be done via a direct conversion between formats (e.g., the common format can contain the same semantic information as the common format, but can instead use a different structural format). In the case of input formats which do not directly contain some of the sections but instead include information which allows those sections to be inferred, appropriate conversion to the common format is performed based on the information in the input format.

Figure 8:
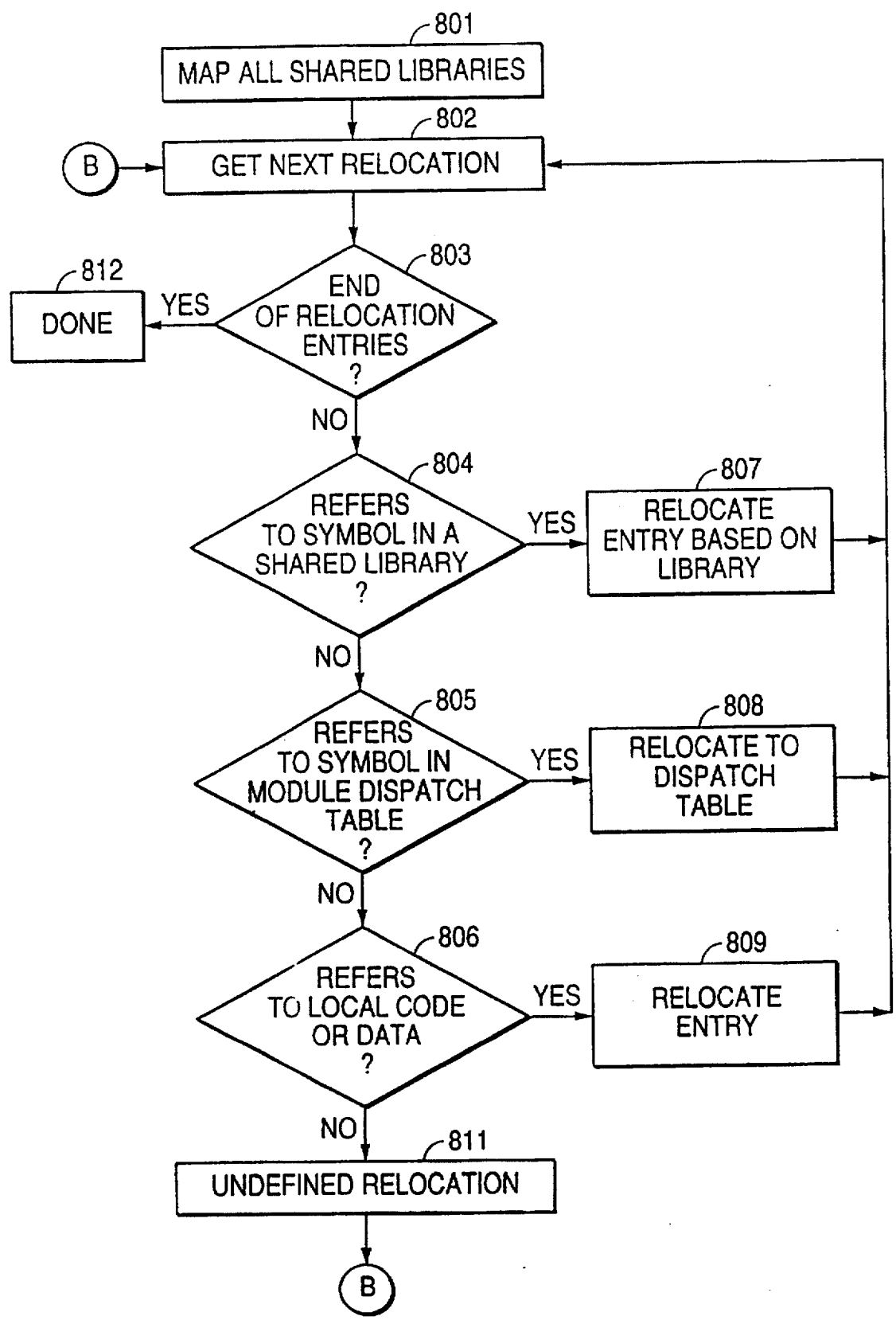
FIG. 8 shows details of remaining relocation steps which can be performed in a terminal (step 609 of FIG. 6), such as by terminal loader 304 of FIG. 3.

FIG. 8 shows additional details of the remaining code relocation steps in the terminal (step 609 of FIG. 6)—i.e., how terminal loader 705 performs the remaining steps necessary to prepare each downloaded package for execution in the terminal. Beginning in step 801, all shared libraries referenced in the downloaded package are located and mapped. Generally speaking, terminal loader 705 can use a shared library table included in the downloaded package which maps indexes to names of shared libraries to find all shared libraries required by the package, and build a new table mapping from each index to the library's information structure including pointers to the code and data for the shared library. If a shared library is not found, a warning can be logged, and the information structure address in the table can be set to zero, indicating that the shared library is not present.

In step 802, the next relocation entry is extracted from the downloaded package. In step 803, a test is made to see if there are any more relocation entries to be analyzed and, if the end of the relocation entries section has been reached, then processing transfers to step 812 and the relocation is completed.

Assuming there are more relocation entries to be processed, then in step 804 a test is made to determine whether the relocation refers to a symbol in a shared library. If so, then in step 807 the entry is relocated based on the shared library location, and the relocation is deleted. This can be done by locating the shared library information structure as referenced by the index to the symbol. If the shared library information structure is zero (indicating that the shared library is not present), the relocation is skipped. If it is not zero, the relocation is done using the address of the code or data as defined in the information structure, and the offset indicated in the symbol. Processing thereafter resumes in step 802.

If, in step 805, the relocation entry refers to a symbol in the module dispatch table (MDT), then in step 808 the reference (instruction or data) is relocated using the dispatch table. Terminal loader 705 can maintain a mapping of names to information structures, wherein the information structures contain the dispatch table address for each package which has been loaded. If the MDT is the local MDT for the module, the actual MDT as initialized by terminal loader 705 may be used instead of the MDT internal to the module.

If, in step 806, the relocation refers to code or data which is local to the module, then in step 809 the entry is relocated using conventional methods, since the address of the start of the code and data sections are now known by terminal loader 705, and the relocation contains the section indicator (code or data) and the offset into the section.

If a relocation meets none of the tests in steps 804, 805 or 806, the relocation is undefined. After all relocation entries have been processed, in step 812 the relocation is complete and the processed module(s) may be executed.

It is apparent that many modifications and variations of the present invention are possible, and references to specific values are by example only. Although the invention has application to cable television networks, the term "network" is intended to include satellite transmission networks, radio transmission means, and other communication media. The term "modules" as used herein includes application programs, subparts of programs, operating systems, "patches", data tables, groups of interpretable instructions, and the like.

It is, therefore, to be understood that within the scope of the appended claims the invention may be practiced otherwise than as specifically described.

We claim:

1. A computer implemented method of preparing a computer program for execution in a terminal, comprising the steps of:
   (1) in a computer, transforming object code comprising undefined symbols into a package comprising partially resolved symbols on the basis of a table which correlates certain symbols in the object code with known addresses in a terminal, the package comprising a code section including computer instructions which reference the partially resolved symbols, a data section including modifiable data values, and a header which indicates the size of the code section and the data section;
   (2) transmitting the package across a network to the terminal;
   (3) receiving in the terminal the package transmitted in step (2); and
   (4) resolving in the terminal remaining undefined symbols in the package on the basis of information stored in the terminal.

2. The method of claim 1, wherein the object code comprises relocation entries each of which indicates a reference elsewhere in the object code to an undefined memory location, the method further comprising the steps of, prior to step (2):
   (a) relocating one or more of the references to the undefined memory location on the basis of one of the relocation entries and a symbol resolved in step (1);

(b) deleting the relocation entry from the object code; and (c) storing the relocated references to the undefined memory location into the package; and wherein step (4) comprises the step of resolving any remaining relocation entries in the package on the basis of information stored in the terminal.

3. The method of claim 2, wherein step (a) comprises the step of replacing an absolute memory reference with a relative memory reference.

4. The method of claim 1, further comprising the step of, prior to step (1), concatenating corresponding code and data sections from separately compiled modules into the object code.

5. The method of claim 1, further comprising the steps of, prior to step (4):

(5) allocating a first memory area corresponding to the size of the unmodifiable code section in a protected portion of memory in the terminal and a second memory area corresponding to the size of the modifiable data area in an unprotected portion of memory in the terminal; and (6) storing the unmodifiable code section from the received package into the protected portion of the memory and storing the modifiable data section from the received package into the unprotected portion of the memory.

6. The method of claim 5, wherein step (6) comprises the step of storing the unmodifiable code section and the modifiable data section into a memory which already contains at least one previously loaded application program.

7. A terminal comprising a computer program prepared in accordance with the method of claim 1.

8. A computer implemented method of downloading a computer program into a Home Communications Terminal (HCT), comprising the steps of:

(0) in a computer relocating on the basis of references to symbols contained in a module dispaatch table at least some executable computer instructions contained in a collection of object code thereby producing partially relocated object code;

(1) in the computer, transforming the partially relocated object code into a package, the package comprising a code section containing executable computer instructions, a data section separate from the code section and containing modifiable data elements, a temporary storage section separate from the code and data sections and containing temporary information needed to relocate executable computer instructions in the code section, and a header comprising a size of each of the code section, data section, and temporary storage section;

(2) transmitting the package of step (1) across a network;

(3) receiving the package transmitted in step (2) in the HCT;

(4) allocating separate areas in a memory of the HCT for each of the code section, data section and temporary storage section according to the corresponding sizes thereof in the header; and (5) copying each of the code section, data section and temporary storage sections from the received package into the allocated separate memory areas.

9. A Home Communications Terminal comprising a computer program downloaded in accordance with the method of claim 8.

10. The method of claim 8, further comprising the step of decompressing at least one of the code section, data section and temporary storage sections in the allocated separate memory areas.

11. The method of claim 8, further comprising the step of relocating one or more of the executable computer instructions copied from the received package.

12. The method of claim 11, wherein the relocating step comprises the step of relocating the one or more executable computer instructions on the basis of references to symbols contained in a module dispatch table.

13. The method of claim 8, wherein step (5) comprises the step of copying the code section into a memory area which is protected from modification, and copying the temporary storage section into a memory area which can be modified.

14. A terminal adapted to receive information from a subscription television network, comprising:

a memory partitioned into a first area comprising memory locations which are protected from modification and a second area comprising memory locations which are not protected from modification;

means for receiving from the network a package comprising a code section containing executable computer instructions, a data section separate from the code section and containing modifiable data elements, a temporary storage section separate from the code and data sections and containing temporary information needed to relocate executable computer instructions in the code section, and a header comprising a size for each of the code section, data section, and temporary storage section;

means for allocating a portion of the first area for storing the code section and a portion of the second area for storing the data section and the temporary storage section on the basis of sizes extracted from the header; and means for copying the code section into the first area and for copying the data section and temporary storage section into the second area;

wherein the memory further comprises a dispatch table which maps references in one or more of the executable computer instructions in the code section to portions of an operating system executing in the terminal.

15. The terminal according to claim 14, further comprising means for relocating one or more executable computer instructions in the code section on the basis of information contained in the temporary storage section.

16. The terminal according to claim 14, wherein each of the code section, data section and temporary storage section are compressed, and wherein the terminal decompresses each section after copying them into the respective memory areas.

17. The terminal according to claim 14, wherein the terminal uses a shared library table included in the package to relocate one or more of the executable computer instructions, and deletes a corresponding relocation entry in the temporary storage area.

18. A system for transmitting computer code to a subscription television terminal, the system comprising at least one computer coupled to a network, the computer programmed to perform the steps of:

(1) compiling source code into object code, the object code comprising undefined symbols and executable instructions which are executable in the subscription television terminal;

(2) packaging the object code into a module package by resolving some but not all of the undefined symbols in the object code on the basis of a table which correlates certain undefined symbols with known addresses in the subscription television terminal, wherein the module package comprises a code section including computer instructions which reference the partially resolved symbols, a data section including modifiable data values, and a header which indicates the size of the code section and the data section; and (3) transmitting the module package across the network into the subscription television terminal.

19. The system of claim 18 wherein the computer is programmed to replace a relocatable instruction with an absolute instruction based on knowledge that a function corresponding to the symbol can be accessed through a known terminal dispatch table entry in the subscription television terminal.

20. The system of claim 18, wherein the module package comprises an application program.

21. The system of claim 18, wherein the network comprises a wired subscription cable television network.

22. The system of claim 18, wherein the network comprises a satellite transmission network.

23. A subscription television terminal adapted to receive a package comprising resolved and unresolved symbols from a downloading source over a subscription television network, comprising:

a central processing unit which executes instructions received from the downloading source; and a memory partitioned into a first area comprising memory locations which are protected from modification and a second area comprising memory locations which are not protected from modification;

wherein the central processing unit and the memory are programmed with a terminal loader function which performs the steps of:

(1) receiving the package comprising resolved and unresolved symbols from the downloading source over the subscription television network;

(2) allocating a first block of memory in the first area for storing a code section from the package and allocating a second block of memory in the second area for storing a data section from the package, both allocations performed on the basis of code and data sizes transmitted in association with the package;

(3) copying the code section into the first area and the data section into the second area; and (4) resolving unresolved symbols in the package on the basis of information contained in the package.

24. The subscription television terminal according to claim 23, wherein the memory comprises a dispatch table which maps references in one or more instructions in the code section to portions of an operating system which executes in the terminal.

* * * * *